Figure 5:
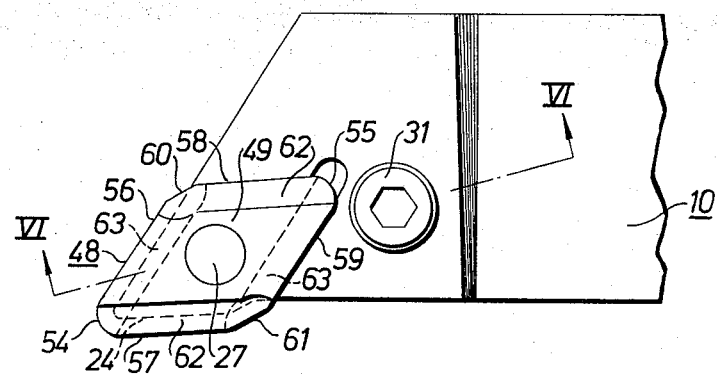

United States Patent [19]
Faber

[11] 3,777,341
[45] Dec. 11, 1973

[54] CUTTING INSERT AND CUTTING TOOL ASSEMBLY

[75] Inventor: Kurt Heinrich Albert Erich Faber, Sandviken, Sweden

[73] Assignee: Sandvik Aktiebolag, Sandvik, Sweden

[22] Filed: May 30, 1972

[21] Appl. No.: 257,530

[52] U.S. Cl. .................................... 29/95 R, 29/96
[51] Int. Cl. ............................................... B26d 1/00
[58] Field of Search ............................ 29/95, 96, 97

[56] References Cited
UNITED STATES PATENTS

| | | | |
|---|---|---|---|
| 3,148,436 | 9/1964 | Werth | 29/96 |
| 3,314,126 | 4/1967 | Stier | 29/96 |
| 3,355,786 | 12/1967 | Hargreaves | 29/96 |
| 3,299,489 | 1/1967 | Pohle | 29/96 |

*Primary Examiner*—Leonidas Vlachos
*Attorney*—Ralph E. Parker et al.

[57] ABSTRACT

The cutting tool assembly of the present invention consists essentially in (*a*) a tool holder and (*b*) an indexible cutting insert of modified rhombic configuration in which pairs of main cutting edges (disposed at an angle of less than 60° with respect to each) are separated by intermediate facing edge portions which are parallel to each other. The intermediate facing edge portions are so configured as to constitute outfacing cutting edges each of which cooperates with the main cutting edge adjacent thereto. Both the pairs of main cutting edges and the out-facing cutting edges are provided with chip-breaking grooves. The assembly provides an arrangement wherein not only the main cutting edge but also the out-facing cutting edge of the cutting insert are laid bare with respect to the tool holder.

7 Claims, 10 Drawing Figures

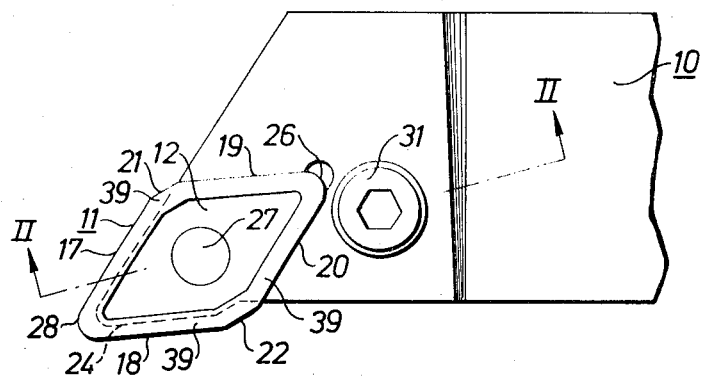

CUTTING INSERT AND CUTTING TOOL ASSEMBLY

The present invention relates to an indexible cutting insert intended for copy turning and having cutting tip angles below 60°, the cutting insert being basically of rhombic configuration and having edge portions which separate the edges extending towards the cutting tips and which extend symmetrically relative the longest diagonal and substantially parallel thereto, at least one of two edges extending to one cutting tip being formed as a main cutting edge and the insert having substantially flat side surfaces being perpendicular to their interconnecting edge surfaces. The invention also concerns with a tool holder and cutting insert combination for copy turning consisting of a holder and a basically rhombic insert of the aforesaid type.

Indexible cutting inserts having cutting tip angles below 60° are being used to an increasingly greater extent in copy turning, a normal cutting tip angle being 55° which enable the insert to be used over a wide field. There are at present a number of different types of commercially available indexible cutting inserts with cutting tip angles of 55°, examples of which include inserts of rhomboidal, rhombic and isosceles configuration and also basically rhombic configuration having edge portions of the aforesaid type, said edge portions, however, only being provided to engage with parallel side wall portions in a recess in a holder for the promotion of secure engagement of said insert in said holder.

In order to satisfy requirements on efficiency in operation and economy, the following demands are made on copy turning indexible cutting tools:

1. The insert must provide for good chip control, i.e., acceptable chip guidance and chip breaking.
2. The insert should not move when subjected to loads.
3. With copy turning, it must be possible to take an angle of 30° when in-facing.
4. It must be possible to take a large cutting depth when out-facing at 90°.
5. Costs of cutting edges or corners must be low, i.e., only small quantities of insert material should be used per cutting edge, and the cutting insert should be of simple manufacture.

It has been impossible hitherto, however, to satisfy all of the aforesaid requirements with one and the same cutting tool, and compromises must be made. For example, the rhomboidal insert intended for copy turning can only be provided with two cutting edges for unidirectional turning, i.e., left-hand turning or right-hand turning, which implies a relatively large amount of cutting material for each cutting edge and therewith high cutting edge costs. Further, while the rhombic and isoscele inserts for copy turning can be provided with four cutting edges for unidirectional turning, i.e., left-hand turning or right-hand turning they must be made relatively large if they are to be capable of removing an acceptable amount of material per cut when out-facing at 90°, with resulting relatively high cutting edge costs. When out-facing at 90° with an insert having a 55° tip angle, the insert is normally used with an entrying angle of 93°, and hence the working allowance when outfacing should not be larger than the length of the cutting edge x sine 3°, i.e., the cutting edge length x 0.05234. Thus if the cutting depth when outfacing at 90° is 1.5 mm, the length of the cutting edge must be 28.6 mm, i.e., there is a markedly disproportionate difference between the cut when copy turning in a direction parallel with the long axis of the workpiece and the attainable cutting depth when copy turning in a direction 90° outwardly from the long axis of said workpiece. For the purpose of maintaining the length of the cutting edge on the copying insert within reasonable limits, it is therefore normal practice to remove part of the working allowance with a conventional in-facing tool or the like prior to out-facing at 90°, which, however, involves an extra working operation and necessitates the use of an additional cutting tool.

Further, a copying insert of triangular configuration is normally difficult to secure in the tool holder in a manner such as to prevent the insert from moving when subjected to loads during a copying operation, since a portion of the cutting forces are transmitted from the insert to the tool holder, via the elements used to clamp the insert to the holder.

One object of the present invention is to provide a new and improved indexable cutting insert for copying operations which is not encumbered with the disadvantages associated with known copying inserts and which satisfies all the aforementioned demands.

Another object of the invention is the provision of a new and improved cutting tool intended to copy turning which consists of a tool holder and an indexible cutting insert of the aforesaid type having cutting tip angles below 60° and being securely fixed in a recess in said tool holder.

To this end there is provided in accordance with the invention an indexible cutting insert for copy turning of the aforementioned type which is characterized in that each of said parallel edge portions is formed as an out-facing cutting edge for co-operation with the main cutting edge that is positioned adjacent thereto, and said main cutting edges and said out-facing cutting edges being provided with chip breaking grooves. In consequence of this arrangement it is possible to take a large cut when out-facing while the length of the main cutting edges need not be greater than that required for taking those working allowances being normal at longitudinal turning.

The indexable cutting insert according to the invention can, at least when intended for profiling operations of workpieces, which are able to withstand relatively high cutting forces, be provided with four main cutting edges for either right-hand turning or left-hand turning wherewith both of the substantially flat side surfaces of the insert are provided with chip breaking grooves which extend peripherally on both sides thereof. Thus the chip breaking grooves extend along all those edges extending towards the cutting tips as well as along the said parallel edge portions, wherewith each of said parallel edge portions is formed as an out-facing cutting edge for co-operation with both of those main cutting edges which are positioned adjacent thereto.

If the cutting forces must be kept low, for example when profiling a slender workpiece, it is preferred instead to provide the insert with four main cutting edges disposed therearound alternately on one flat side surface and the other flat side surface of said insert for either right-hand turning or left-hand turning. Thus, the insert is only provided with chip breaking grooves along those edge portions which are intended for cutting engagement with a workpiece, i.e., there is not provided any chip breaking grooves along those edges extending towards the cutting tips which are not formed as main cutting edges. In consequence of this arrangement that portion of the insert, which is located underneath the edge used as a main cutting edge, will obtain a reliable support against the supportable surface in the recess adapted therefor in the tool holder. Thus, the chip breaking grooves can, to advantage, be of such magnitude that a positive chip angle is obtained at both the main cutting edges and the out-facing cutting edges.

The invention will now be described in detail with reference to the accompanying drawings, additional characteristic features of the invention being made apparent in conncetion therewith.

Figure 6:
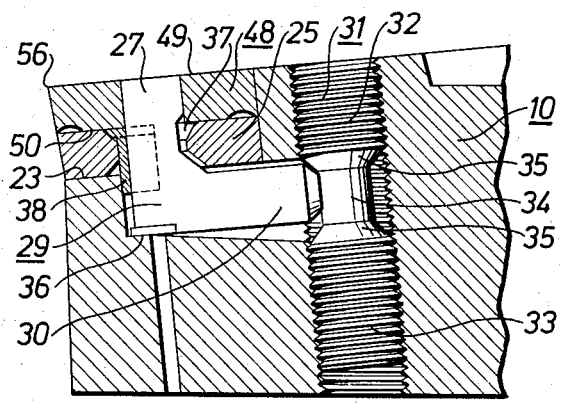
Figure 7:
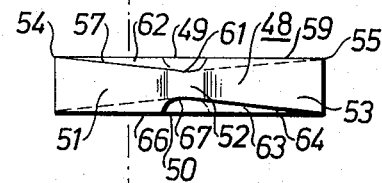
Figure 8:
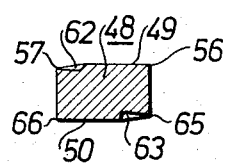
Figure 9:
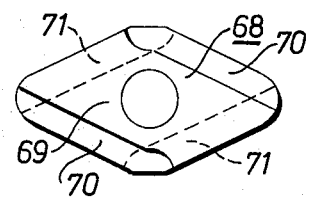
Figure 10:
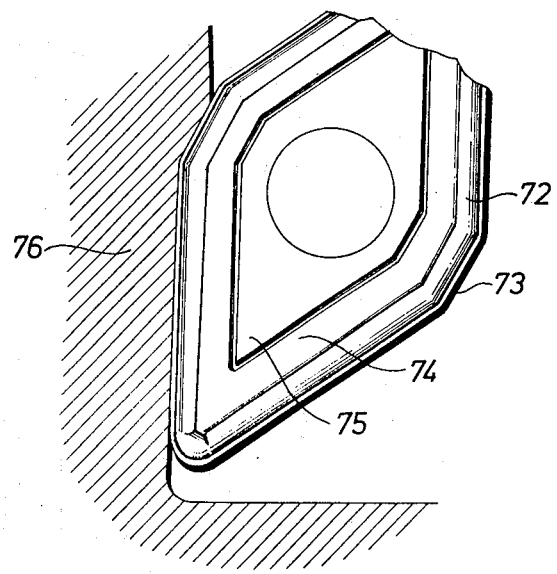

In the drawings,

FIG. 1 is a plan view of a portion of a cutting tool comprising an indexible cutting insert for copy turning according to one embodiment of the invention, FIG. 2 is a sectional view taken generally along the plane of line II—II in FIG. 1, FIG. 3 is a side view of the insert illustrated in FIG. 1 and FIG. 2, FIG. 4 is a sectional view taken along the plane of line IV—IV in FIG. 3, FIG. 5 is a plan view of a portion of a cutting tool comprising an indexible cutting insert for copy turning according to another embodiment of the invention, FIG. 6 is a sectional view taken generally along the plane of line VI—VI in FIG. 5, FIG. 7 is a side view of the insert illustrated in FIG. 5 and FIG. 6, FIG. 8 is a sectional view taken along the plane of line VIII—VIII in FIG. 7, FIG. 9 is a plan view of another embodiment of a cutting insert according to the invention, and FIG. 10 is a plan view of another embodiment of a cutting insert of the invention that is brought into cutting engagement with a workpiece.

The cutting tool illustrated in FIGS. 1 and 2 includes a holder 10 for left-hand turning, of which only a portion is shown and which is terminated at its forward end with a pointed section in which is arranged a recess for an indexible cutting insert 11 constructed in accordance with the invention. The cutting insert 11, also illustrated in FIGS. 3 and 4, is basically of rhombic configuration and has cutting tip angles below 60°. The flat side surfaces 12 and 13 of the insert extend parallel to one another and form right angles with their interconnecting edge surfaces, of which edge surfaces three are shown in FIG. 3 with the reference numerals 14, 15 and 16. When the insert is taken in plan view, the edges 17, 18 and 19, 20 extending towards the cutting tips of the insert are separated by edge portions 21, 22 which extend symmetrically in relation to the longest diagonal and are substantially parallel therewith. When the insert 11 is clamped in the position illustrated in FIG. 1, the edge 18 forms a main cutting edge and the edge 17 a secondary cutting edge, and the edge portion 22 connecting to the main cutting edge 18 is located outside the supporting surface 23 of the insert recess disposed in the holder 10, as are also the main cutting edge and the secondary cutting edge, the defining edges of the support surface 23 extending along the edges 17, 18, 22 being shown by a dotted line 24 in FIG. 1. The basically rhombic indexible cutting insert 11 rests on the support surface 23 via a shim plate 25 and is inclined around an axis which forms an angle of such magnitude with the shortest diagonal extending through the centre point of the edge surface 15 and the centre point of the edge surface located opposite thereto that clearance angles are presented at both the main and the secondary cutting edges 17, 18 and the edge portion 22. Thus, the edge portion 22 is according to the invention formed as an outfacing cutting edge, so that when facing out at, for example, 90° a large cut can be taken, while the length of the edges 17, 18, 19, 20 need not be greater than those normal working allowances required for longitudinal turning. In this way, the chips formed when out-facing at 90° are broken and controlled more advantageously than with known copying inserts, such chips being problematic when using conventional cutting tools as a result of the wide width and small thickness of the chips. Although the invention is not restricted thereto, the angle of inclination on the support surface 23 can be selected so that a clearance angle of apprroximately 6° is obtained at the main cutting edge 18 and of approximately 2° or slightly larger at the secondary cutting edge 17 and the out-facing cutting edge 22.

In addition to the support surface 23, the recess also presents two side support surfaces for the edge surfaces of the insert 11, the side support surfaces extending towards the tip not located in a position to perform cutting work, i.e., the tip 26 of the illustrated cutting insert. The indexible cutting insert 11 is clamped in the recess by means of a pin 27 projecting into a hole which passes centrally through the flat sidesurfaces 12, 13 of the insert, the diameter of said hole preferable being longer than the length of the parallel edge portions 21, 22 wherewith said pin urges the converging edge surfaces remote from the cutting tip 28, which in the illustrated embodiment is the tip being used, against the side support surfaces, which are of substantially complementary shape to the converging edge surfaces. The pin 27, suitably in the illustrated manner, forms one leg of a substantially L-shaped locking member 29 pivotally arranged in a recess in the holder 10, the other leg 30 of which member extends away from the cutting tip 28, suitably in a direction which forms an angle with both the longest and the shortest diagonal of the basically rhombic cutting insert 11. Actuating means 31 are provided to move the leg 30 downwardly and by this cause a pivoting action of the locking member around an axis, said axis forming substantially a right angle with the direction in which the leg 30 extends. In the illustrated embodiment, the means 31 is in the form of a screw threadably engaged in a hole in the holder 10. The screw 31 has two threaded end portions 32, 33 separated by a generally cylindrical portion 34 of reduced diameter and having conical end portions 35 arranged to engage the free end of the leg 30 of the L-shaped locking member 29, when the screw 31 is turned, to cause said pivoting action of the locking member around a support or fulcrum point 36 formed in the holder 10.

The leg 27 passes through an opening 37 in the shim plate 25, the opening being shaped and dimensioned so as not to impeded desired pivotal movement of the leg 27. A pin 38 of generally U-shaped cross section and whose limb members extend rearwardly in the direction of the leg 30 serves to detachably secure the shim plate 25 in the recess.

The insert 11 is provided with chip breaking grooves 39, 40 which extend peripherally on both sides thereof, as shown in FIG. 3 and FIG. 4. Thus, in this way there is obtained eight main cutting edges with associated secondary cutting edges and out-facing edges, four each for lefthand turning and for right-hand turning. Hence, the edges 18 and 19 as well as the edges 41 (FIG. 2) and 42 (FIG. 2,3 and 4), which are located opposite the edges 17 and 20 on the opposite flat side surface 13 of the insert can be used as main cutting edges for left-hand turning. The edges 17 and 20 as well as the edges 43 (FIG. 3) and 44 (FIG. 4) which are located opposite the edges 18 and 19 on the opposite flat side surface 13 of the insert can be used as main cutting edges for righthand turning. The cutting tips, which are located on the flat side surface 13 are indicated at 45 and 46, wherewith the cutting edges 42,44 converge against the cutting tip 45 while the cutting edges 41, 43 converge against the cutting tip 46. The out-facing cutting edge that separates the edges 42,43 is shown at 47 in FIG. 3 while the out-facing cutting edge that separates the edges 41 and 44 is not shown in any Figure. The out-facing cutting edges 21,22,47 are each adapted for cooperation with the cutting edges 19, 18 and 42 respectively, as well as the cutting edges 17, 20 and 43 respectively. In the same way the out-facing cutting edge, which is not being shown in the figures, is adapted to co-operate with the edge 41 in left-hand out-facing, and to co-operate with the edge 44 in right-hand out-facing.

It will be understood that the insert shown in FIGS. 1–4 in the first place is adapted for use in such profiling operations where the copy turning machine used and the workpiece can withstand relatively high cutting forces, as the depth of the chip breaking grooves 39, 40 can hardly be of such magnitude that a positive chip angle is obtained if the portion of said insert located opposite the edge of the main cutting edge is to get a satisfactory support.

To enable slender workpieces to be machined satisfactory, or when it is desirable for other reasons to keep the cutting forces low, it is preferred to provide an insert with a configuration as described below with reference to FIGS. 5–8. In said figures, the insert of the invention is indicated at 48, said insert being clamped in a tool holder for lefthand turning in FIG. 5 and FIG. 6. The holder in said figures is exactly the same as the holder in FIG. 1 and FIG. 2 and is, hence, provided with the same reference numbers. Thus, no detailed description of said holder is given below, reference being made to the description of said holder earlier presented in conncetion with FIG. 1 and FIG.2.

As being shown in FIGS. 5–8, the insert 48 like the insert 11 has basically rhombic configuration and cutting tip angles below 60°. The substantially flat side surfaces 49 and 50, which are parallel to each other, are located at a right angle at the intersection of the edge surfaces, three of which being shown in FIG. 7 and indicated at 51, 52 and 53. The edge pairs 56,57 and 58,59 which are converging against the cutting tips 54,55 adjacent the flat side surface 49 are separated by edge portions 60,61 which extend symmetrically relative the longest diagonal and substantially parallel thereto. Chip breaking grooves 62 are formed along the edges 57, 58 and the edge portions 60,61 in the flat side surface 49. In the embodiment illustrated in FIG.5 the edge 57 is forming a main cutting edge while the edge 56 is forming a secondary cutting edge, and the edge portion 61 located adjacent the main cutting edge is like said edges located outside the support surface in the recess in the holder, the boundaries of said supportable surface located along the edges 56,57,61 being indicated by a dotted line 24 in FIG. 5. If the insert 48 is turned in such a manner that the cutting tips 54 and 55 change places, the edge 58 will form a new main cutting edge and the edge 59 will form a new main cutting edge and the edge 59 a secondary cutting edge, wherewith the edges 58,59 and the edge portion 60 will be located outside the support surface 23. The insert 48 is clamped in said holder in the way earlier described in connection with FIG. 1 and FIG.2, thus enabling edge portion 61 in the location shown and edge portion 60, after twisting the insert 180°, to be usable as out-facing cutting edges so that when facing out at, for example 90 ° a large cut can be taken with a highly acceptable chip control and chip breaking effect, while the length of the edges 56,57,58,59 need not be greater than those normal working allowances required for longitudinal turning.

The copying insert 48 is also provided with main cutting edges, secondary cutting edges and out-facing cutting edges adjacent the flat side surface 50, and chip breaking grooves 63 being formed along said main cutting edges and said out-facing cutting edges. The said main cutting edges are indicated 64 in FIG.7 and 65 in FIG.8. One of said secondary cutting edges and one of said out-facing edges are indicated at 66 in FIGS. 7–8 and 67 in FIG.7 respectively, while the remaining secondary cutting edge and out-facing edge are not being shown in the FIGS. 5–8. The cutting edges are arranged in such a manner that the insert has four main cutting edges disposed there around alternately on one flat side surface and the other flat side surface of said insert as well as accompanying secondary cutting edges and out-facing cutting edges for left-hand turning. In consequence of forming chip breaking grooves 62,63 only along said main cutting edges and said out-facing edges a satisfactory support is attainable for the portion of the insert located under the edge being used as the main cutting edge during a profiling operation. The chip breaking grooves 62, 63 can without inconvenience be made of such depth that a positive chip angle is obtained with the insert. In accordance with one advantageous feature of the invention, the edges forming four main cutting edges and the edge portions forming four outfacing edges in the insert 48 of FIGS. 5–8 are located substantially beneath associated flat side surfaces 49,50, each main cutting edge 57,58,64 or 65 being located substantially in a plane which passes through the cutting tip associated with the main cutting edge or a point adjacent thereto and which forms an angle with the flat surface of the insert associated with the main cutting edge, as will best be seen from FIG. 7. In this way highly acceptable chip control is obtained, the chip breaking effect being increased from the cutting tip rearwardly. The chip control can be further improved by forming the chip breaking groove so that its width and depth increase from the cutting point end of each main cutting edge to its junction point with the edge portion forming the associated out-facing cutting edge. This latter construction of the chip braking groove can also, as being shown with the insert 68 in FIG. 9, be applied to advantage with copying inserts with which all the cutting edges are located in the same plane as the associated flat surface on the insert, as is the case with insert 11 in FIGS. 1–4. In FIG. 9 the chip breaking grooves on the upper flat side surface 69 of the insert 68 are indicated at 70, while the chip breaking grooves in the opposite flat side surface is indicated by dotted lines at 71. The chip breaking grooves can be directly adhered on to the cutting edge which may be sharp or slightly rounded. They can also be adhered on to the cutting edge via a flat bevel 73, as will be seen from FIG. 10, said flat bevel serving as an edge strengthening. The chip breaking grooves are indicated at 72 in FIG. 10. The said chip breaking grooves adhere inwardly to a flat surface 74. In the embodiment shown in FIG. 10 said surface 74 is located somewhat above the centrally located flat surface 75 of same insert. A workpiece being brought in cutting engagement with said insert is indicated at 76.

The edges and edge portions of the insert are preferably adapted so that, when the insert is seen in plan view, all edge surfaces of the insert extend tangentially to an imaginary circle inscribed on the insert. Preferably cutting tip angles of 55° are used, although larger and smaller tip angles can be used, if so desired. The use of cutting tip angles larger than 55° is made possible owing to the fact that the arrangement of the present invention permits copying operations to be effected at an entrying angle of practically 90°, wherewith the main cutting edges will take a finishing cut when outfacing at 90°. The invention is not restricted to the described and illustrated embodiment but can be modified within the scope of the following claims. For example, the indexible cutting insert may be clamped in position by means of clamping elements acting on the upper surface thereof.

I claim:

1. A copy turning indexible cutting insert having cutting tip angles below 60°, the cutting insert 11 being basically of rhombic configuration and having edge portions 21, 22 which separate the edges 17, 18, 19, 20 extending towards the cutting tips and which extend symmetrically relative the longest diagonal and substantially parallel thereto, at least one of two edges extending to one cutting tip being formed as a main cutting edge and the insert having substantially flat side surfaces 12, 13 being located at a right angle at the intersection of the edge surfaces, 14, 15, 16, characterized in that each of said parallel edge portions 21, 22 is formed as an out-facing cutting edge for co-operation with the main cutting edge 18, 19 located adjacent thereto, and said main cutting edges and said outfacing cutting edges being provided with chip breaking grooves 39, 40 said insert being adapted for engagement in a recess in a tool holder in such a manner that the edge forming the main cutting edge as well as the out-facing edge located adjacent thereto are laid bare with respect to said holder.

2. A cutting insert according to claim 1, characterized in that the main cutting edges 18, 19, 43 and said edge portions 21, 22, 44 are located substantially beneath associated flat side surfaces 12, 13, each main cutting edge being located substantially in one plane which passes through the cutting tip 26, 28 associated with the main cutting edge and forms an angle with the flat side surface associated with the main cutting edge.

3. A cutting insert according to claim 1, characterized in that the width and depth of the cutting chip breaking grooves 39, 40, increase in depth and width from the cutting tip end 26, 28 of each main cutting edge 18, 19, 43 to the junction point of said cutting tip end with the associated edge portion 21, 22.

4. A cutting insert according to claim 1, characterized in that the chip breaking grooves 39, 40, 72 adhere on to the cutting edges via a flat bevel 73.

5. A cutting insert according to claim 1, characterized in that all edge surfaces 14, 15, 16 of the insert extend substantially tangentially to a circle inscribed in the basically rhombic insert 11, 48.

6. A cutting insert according to claim 1, characterized in that the insert 11, 48 has a hole which passes centrally through the flat side surfaces 12, 13 that is disposed to received a pin 27 to secure the insert into clamping engagement with substantially complementary support surfaces of a recess in a holder 10.

7. A cutting insert according to claim 6, characterized in that the diameter of the centrally disposed hol of the insert is greater than the length of the edge portions 21, 22.

* * * * *

UNITED STATES PATENT OFFICE
CERTIFICATE OF CORRECTION

PATENT NO. : 3,777,341
DATED : December 11, 1973
INVENTOR(S) : Kurt Heinrich Albert Erich Faber It is certified that error appears in the above-identified patent and that said Letters Patent are hereby corrected as shown below:

[30] Foreign Application Priority Data

May 28, 1971    Sweden....................6932/71

May 28, 1971    Sweden....................6933/71

Signed and Sealed this

Thirty-first Day of May 1977

[SEAL]

Attest:

RUTH C. MASON
*Attesting Officer*

C. MARSHALL DANN
*Commissioner of Patents and Trademarks*

REEXAMINATION CERTIFICATE (29th)

United States Patent [19]

Faber

[11] B1 3,777,341

[45] Certificate Issued Oct. 26, 1982

[54] CUTTING INSERT AND CUTTING TOOL ASSEMBLY

[75] Inventor: Kurt Heinrich Albert Erich Faber, Sandviken, Sweden

[73] Assignee: Sandvik Aktiebolag, Sandviken, Sweden

Reexamination Request

No. 90/000,149, Jan. 27, 1982.

Reexamination Certificate for:
  Patent No.: 3,777,341
  Issued: Dec. 11, 1973
  Appl. No.: 257,530
  Filed: May 30, 1972

[30] Foreign Application Priority Data

May 28, 1971 Sweden .............................. 6932/71
May 28, 1971 Sweden .............................. 6933/71

[51] Int. Cl.³ .............................................. B26D 1/00
[52] U.S. Cl. ........................ 407/114; 407/101; 407/105
[58] Field of Search...407/87, 93, 94, 98, 106, 108, 407/114, 101, 105

[56] References Cited

U.S. PATENT DOCUMENTS 3,156,032  11/1954  Lundgren.
3,371,567   3/1968  Davis.
3,546,759  12/1970  Sirola.

OTHER PUBLICATIONS

Brochure—"Widia Prismer Halter" (pp. 2, 4, 5) with English translation.

Primary Examiner—Leonidas Vlachos

[57] ABSTRACT

The cutting tool assembly of the present invention consists essentially in (a) a tool holder and (b) an indexible cutting insert of modified rhombic configuration in which pairs of main cutting edges (disposed at an angle of less than 60° with respect to each) are separated by intermediate facing edge portions which are parallel to each other. The intermediate facing edge portions are so configured as to constitute out-facing cutting edges each of which cooperates with the main cutting edge adjacent thereto. Both the pairs of main cutting edges and the out-facing cutting edges are provided with chip-breaking grooves. The assembly provides an arrangement wherein not only the main cutting edge but also the out-facing cutting edge of the cutting insert are laid bare with respect to the tool holder.

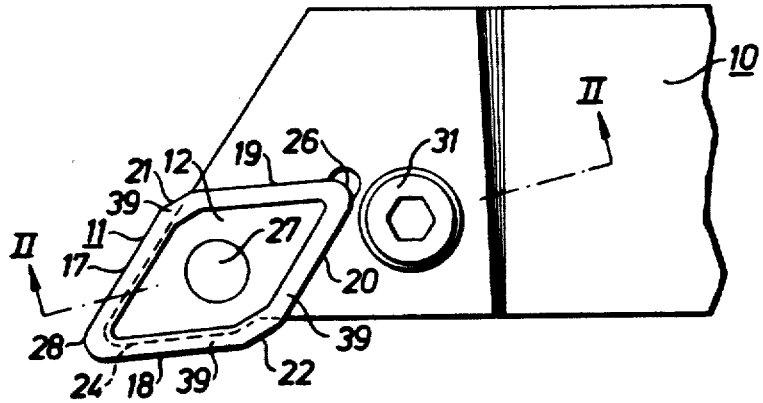

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1–7 is confirmed.

* * * * *